United States Patent Office 3,451,023
Patented June 17, 1969

3,451,023
TOROIDAL WINDING STRUCTURES
Norman Aveyard and David George Bull, Stafford, England, assignors to The English Electric Company Limited, London, England, a British company
Filed Dec. 21, 1966, Ser. No. 603,475
Claims priority, application Great Britain, Dec. 21, 1965, 54,107/65
Int. Cl. H01f 27/28
U.S. Cl. 336—180                                2 Claims

ABSTRACT OF THE DISCLOSURE

U-shaped plural toroidal windings are placed about a cylindrical plural part core. The plural part core is separated by extending insulating spacers which have holes in an outer portion through which the outer arms of the windings are placed. The inner portion of the spacers form shoulders with the inner portions of the windings and an insulating tube adjacent these shoulders. A secondary winding is placed within the insulating tube.

---

Figure 1:
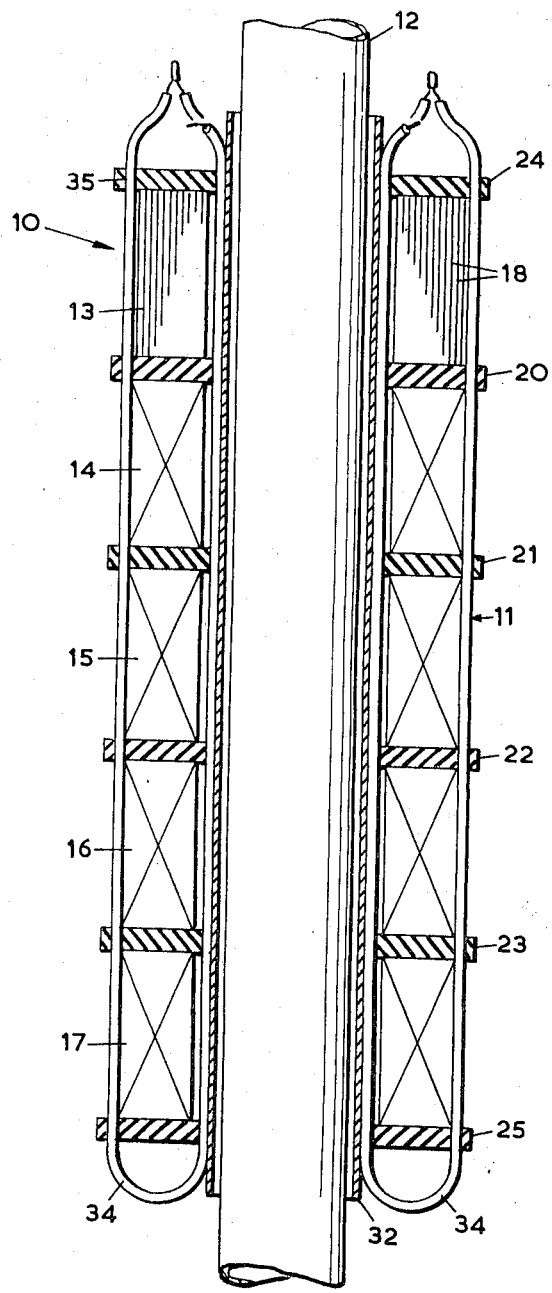

This invention relates to toroidal winding structures, that is to say, structures which comprise one or more toroidal windings and an associated toroidal magnetic core. Such structures, although not so limited, have particular application to transductors whereby current in a straight conductor may be controlled by variation of the magnetic permeability of the magnetic core.

It is a particular object of the present invention to provide a toroidal winding structure which is mechanically robust and yet may easily be assembled.

In accordance with the invention, a toroidal winding structure comprises a toroidal winding and an associated toroidal magnetic core, said toroidal magnetic core comprising a plurality of hollow cylindrical magnetic members coaxially disposed and each providing a closed magnetic path, insulating spacers between pairs of adjacent magnetic members, each spacer extending radially outwardly of the magnetic members where it is circumferentially formed with holes, and extending radially inwardly of the said members at a plurality of circumferentially spaced shoulder portions, a hollow insulating cylinder which extends longitudinally of the core coaxially within the magnetic members and is located in position with respect to the spacers by the said shoulder portions, the magnetic members and the cylinder thereby defining an aperture is combination with each pair of adjacent shoulder portions, and clamping means for longitudinally clamping the magnetic members and the spacers against one another whereby to form the core into a rigid structure, said toroidal winding comprising a plurality of generally U-shaped conductor members disposed circumferentially of the core, each conductor member being arranged to straddle the magnetic members with one arm radially outside the members and with the other arm radailly inside the members, the ends of the arms of the conductor members being disposed at the same end of the core, and interconnections between the arms of the conductor members and forming the conductor members into the toroidal winding, the outer arms of the conductor members each extending through, and located within, said holes in the spacers taken in succession longitudinally of the core, and the inner arms of the conductor members each extending through, and located within, said apertures defined in part by spacers taken in succession longitudinally of the core.

It is a further object of the invention to provide an improved transductor by which the current in a straight conductor may be controlled.

In accordance with this further object, in or for a transductor there is provided a toroidal winding structure comprising a toroidal winding means and an associated toroidal magnetic core, said core comprising a plurality of hollow cylindrical magnetic members coaxially disposed and each providing a closed magnetic path, insulating spacers between pairs of adjacent magnetic members, each spacer extending radially outwardly of the magnetic members where it is circumferentially formed with holes, and extending radially inwardly of the magnetic members at four circumferentially spaced shoulder portions arranged in diametrically opposed pairs, the shoulder portions of the spacers being aligned in four lines longitudinally of the core, a hollow insulating cylinder for receiving within it a heavy current conductor of which the current is to be controlled, said cylinder extending longitudinally of the core coaxially within the magnetic members and being located in position with respect to the spacers by said shoulder portions, the magnetic members and the cylinder thereby defining four circumferentially disposed lines of apertures in combination with the said shoulder portions, and clamping means for longitudinally clamping the magnetic members and the spacers against one another whereby to form the core into a rigid structure, said toroidal winding means comprising four toroidal winding portions disposed circumferentially of the core in correspondence with the said lines of apertures, each winding portion comprising a plurality of generally U-shaped conductor members disposed circumferentially of the core, each conductor member being arranged to straddle the magnetic members with one arm radially outside the members and extending through, and located within, said holes of the spacers taken in succession longitudinally of the core, and with the other arm radially inside the members and extending through, and located within, said apertures of a line of said apertures, for each winding portion the inner arms of the conductor members extending through, and located within, a respective one of said lines of apertures, and the ends of the arms of the conductor members being disposed at the same end of the core and first interconnections interconnecting conductor members of the winding portion, the toroidal winding means further comprising second interconnections interconnecting the winding portions in diametrically opposed pairs to form two windings, one winding being a control winding for the transductor and the other winding being a bias winding for the transductor.

Figure 2:
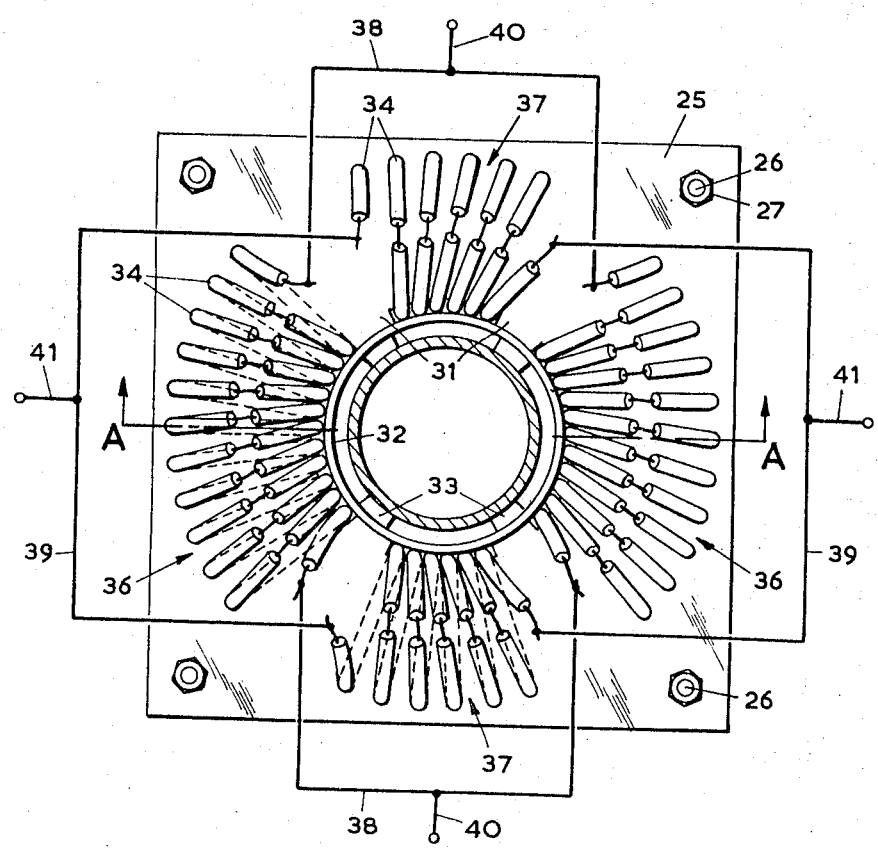

In order that the invention may be more fully understood, a toroidal winding structure in accordance with the invention and associated with part of a straight conductor for controlling the current in the conductor will now be described, by way of example, with reference to the accompanying drawings. In the drawings:

FIG. 1 shows the structure in longitudinal cross-section along the line A—A of FIG. 2; and FIG. 2 is a plan view of the structure showing the interconnections between the conductor members.

Referring to FIGS. 1 and 2, a transductor, shown generally at 10 includes a segmented toroidal magnetic core shown generally at 11. The core is disposed about a tubular conductor 12 which forms the secondary winding of the transductor as is later more fully to be explained.

The magnetic core has five core portions 13 to 17, each constituted by magnetic sheet material insulated on one of its sides and wound in a tight spiral so as to form longitudinal and mutually insulated laminations such as are shown at 18 for the core portion 13.

The core portions are spaced apart along the conductor 12 by square, insulating support and spacing boards 20 to 23 as shown, further boards 24 and 25 identical to the boards 20 to 23 being disposed at the ends of the core to enable the component parts of the core to be clamped together by four longitudinal tie bolts 26 with nuts 27 (FIG. 2) to form a rigid core structure.

This rigid core structure is held in position with respect to the conductor 12 by shoulders 31 formed on the inside of the boards 20 to 25 which abut an insulating tube 32 concentric with the conductor and positioned with respect to the conductor by spacing pieces 33.

Spaced around the circumference of the magnetic core are U-shaped conductor members such as are indicated at 34. These conductor members are of insulated copper rod bent into U-form in the shape of a hairpin, and each member is arranged radially of the magnetic core to straddle the core with one arm adjacent the conductor 12 and the other arm adjacent the outside of the core. The two arms of each member thus extend longitudinally of the core, and they terminate beyond the top end (as shown in FIG. 1) of the core to enable connections to be made as is later to be described.

At their inner arms the members 34 are secured in position by abutment against the tube 32 and at their outside arms the members 34 pass through holes 35 formed in each of the boards 20 to 25.

FIG. 2 shows how the U-shaped conductor members 34 are arranged about the magnetic core and are interconnected to form windings. It will be seen that thirty four such members are provided and these members are grouped in four groups 36, 36, 37 and 37. Of these groups the two groups 36 are disposed on a diameter and each comprises eleven conductor members, and the groups 37 are disposed on the diameter at right angles to the first and each comprises six conductor members.

In each group, the conductor members 34 are connected in series with one another by brazing their winding ends directly together in staggered relationship. Thus, in general, the inner arm of a conductor member 34 is brazed directly to the outer arm of one of the adjacent conductor members, whilst the outer arm of the member is brazed directly to the inner arm of the other adjacent conductor member. In this way, each group of conductor members is formed into a winding, and the two groups 36 are connected in parallel with one another by separate connections 38 to form the control winding for the transductor, the groups 37 being similarly connected in parallel by separate connections 39 to form the bias winding for the transductor.

Connections 40 and 41, made respectively to the control winding and the bias winding, are energisable from separate supply sources (not shown) so that the state of magnetisation of the magnetic material in the core 11 may be controlled up to saturation. The transductor 10 may therefore operate in known manner to vary the inductive impedance of the conductor member 12 which forms its single turn secondary winding.

Such operation form no part of the invention and will therefore not further be described.

A preferred method of forming the magnetic core 11 with the windings shown in FIG. 1 and 2 comprises the following steps:

The five core portions 13 to 17 are individually formed from a length of the magnetic sheet material which is spirally wound.

The magnetic core 11 is then built up by disposing these core portions alternately with the boards 20 to 25 (as shown) which are themselves threaded over the bolts 26. The nuts 27 are then used to clamp the core portions and the boards loosely together.

The conductor members 34, prebent in the form of a hairpin with straight sides, are then disposed about the core as shown with their outer arms threaded through hte holes in the boards 20 to 25 and with their open ends at the same end of the core, the insulating tube 32 is pushed down the central bore of the core so as to locate the inner arms of the members 34, and the nuts 27 tightened fully down. Finally, the free ends of the conductor members 34 are bent as required and the necessary connections made between them by brazing to form the windings.

For operation as a transductor, the core has the tubular conductor 12 disposed in its central bore, and this conductor may be a separate item which forms part of the assembly for later connection into the associated control circuit.

Alternatively the transductor may be assembled on site by sliding the magnetic core 11 over the conductor member of the relevant part of the associated control circuit. In one possible arrangement the conductor 12 constitutes part of a bushing stem.

A method such as has been described above for forming a winding about a toroidal core is of particular use for windings "wound" with a heavy current conductor, because each member can be preformed to its U-shape before application to the core, and the only bending which is then necessary to form the winding is at the top of the core to enable the connections to be made between winding members.

Such a winding method is therefore of particular application to transductors which control very heavy currents and of which the control and bias windings must therefore also carry currents of substantial magnitude, one such application being to transformer tap-changing schemes where a transductor is used to provide stepless voltage control between tappings.

Hitherto transductors for such heavy current duty have usually been provided with a number of separate cores spaced along the heavy current conductor each core of which is wound by a normal winding method with control and/or bias windings having a winding conductor of relatively small cross-section, the windings then being connected in parallel to provide sufficient current carrying capacity.

By winding the control and bias windings around a single toroidal core by a method such as is described with respect to the drawings, these windings may usually be wound with a single conductor of heavy section. Such a conductor has a substantial inherent robustness, and the resulting arrangement is mechanically more satisfactory than an arrangement, such as has been described above, of parallel connected windings on separate cores.

It is not essential that all the conductor members of a group be connected in series with one another as is shown in FIG. 2. For example, the conductor members may be arranged in pairs of parallel connected members, the pairs of members then being connected in series. In another possible arrangement a heavy current winding having only one winding turn is provided by connecting a plurality of the U-shaped conductor members in parallel.

Any number of windings, space considerations permitting, may be disposed around the toroidal core. If two or more windings are provided each having two parallel connected winding portions, then preferably the two winding portions of each winding are disposed on a diameter, as is shown in FIG. 2 for the two windings of the transductor.

In the described embodiment, the magnetic core 11 has magnetic laminations which are constituted by spirally wound magnetic sheet material and which therefore extend axially of the core. In an alternative core arrangement, however, the laminations are constituted by separate sheets of magnetic material having their planes perpendicularly disposed with respect to the core axis.

The method of the present invention is not limited to the forming of heavy current windings about toroidal magnetic cores of generally cylindrical form and having a length which is large compared with the radial thickness (as has been described with respect to the drawings); other configurations of toroidal magnetic core may, in fact, be formed with heavy current windings by the method of the present invention.

We claim:
1. A toroidal winding structure comprising a toroidal winding and an associated toroidal magnetic core, said toroidal magnetic core comprising:
   a plurality of hollow cylindrical magnetic members coaxially disposed and each providing a closed magnetic path,
   insulating spacers between pairs of adjacent magnetic members, each spacer extending radially outwardly of the magnetic members where it is circumferentially formed with holes, and extending radially inwardly of the said members at a plurality of circumferentially spaced shoulder portions,
   a hollow insulating cylinder which extends longitudinally of the core coaxially within the magnetic members and is located in position with respect to the spacers by the said shoulder portions, the magnetic members and the cylinder thereby defining an aperture in combination with each pair of adjacent shoulder portions, and
   clamping means for longitudinally clamping the magnetic members and the spacers against one another whereby to form the core into a rigid structure,
   said toroidal winding comprising:
   a plurality of generally U-shaped conductor members disposed circumferentially of the core, each conductor member being arranged to straddle the magnetic members with one arm radially outside the members and with the other arm radially inside the members, the ends of the arms of the conductor members being disposed at the same end of the core, and
   interconnections between the arms of the conductor members and forming the conductor members into the toroidal winding, the outer arms of the conductor members each extending through, and located within, said holes in the spacers taken in succession longitudinally of the core, and the inner arms of the conductor members each extending through, and located within, said apertures defined in part by spacers taken in succession longitudinally of the core.

2. In or for a transductor, a toroidal winding structure comprising a toroidal winding means and an associated toroidal magnetic core, said core comprising:
   a plurality of hollow cylindrical magnetic members coaxially disposed and each providing a closed magnetic path,
   insulating spacers between pairs of adjacent magnetic members, each spacer extending radially outwardly of the magnetic members where it is circumferentially formed with holes, and extending radially inwardly of the magnetic members at four circumferentially spaced shoulder portions arranged in diametrically opposed pairs, the shoulder portions of the spacers being aligned in four lines longitudinally of the core,
   a hollow cylinder for receiving within it a heavy current conductor of which the current is to be controlled, said cylinder extending longitudinally of the core coaxially within the magnetic members and being located in position with respect to the spacers by said shoulder portions, the magnetic members and the cylinder thereby defining four circumferentially disposed lines of apertures in combination with the said shoulder portions, and
   clamping means for longitudinally clamping the magnetic members and the spacers against one another whereby to form the core into a rigid structure,
   said toroidal winding means comprising:
   four toroidal winding portions disposed circumferentially of the core in correspondence with the said lines of apertures, each winding portion comprising:
   a plurality of generally U-shaped conductor members disposed circumferentially of the core, each conductor members being arranged to straddle the magnetic members with one arm radially outside the members and extending through, and located within, said holes of the spacers taken in succession longitudinally of the core, and with the other arm radially inside the members and extending through, and located within, said apertures of a line of said apertures, for each winding portion the inner arms of the conductor members extending through, and located within, a respective one of said lines of apertures, and the ends of the arms of the conductor members being disposed at the same end of the core, and
   first interconnections interconnecting conductor members of the winding portion,
   the toroidal winding means further comprising:
   second interconnections interconnecting the winding portions in diametrically opposed pairs to form two windings, one winding being a control winding for the transductor and the other winding being a bias winding for the transductor.

References Cited

UNITED STATES PATENTS

| 687,141 | 11/1901 | Everest | 336—198 X |
| 2,079,697 | 4/1937 | Ranges | 336—197 X |
| 2,333,015 | 10/1943 | Kramer | 336—219 X |
| 2,655,623 | 10/1953 | Parker | 336—212 X |
| 2,920,297 | 1/1960 | Spicer | 336—175 X |
| 3,074,039 | 1/1963 | Ford | 336—213 |

FOREIGN PATENTS 267,474  12/1927  Great Britain.

LEWIS H. MYERS, *Primary Examiner.*

ELLIOT GOLDBERG, *Assistant Examiner.*

U. S. Cl. X.R.

336—175, 199, 212, 219, 223, 229